Oct. 29, 1957 G. H. DIMOND 2,811,002
CAPPING CHUCK
Filed March 22, 1955 2 Sheets-Sheet 1

INVENTOR.
George H. Dimond
BY
John J. McGlew
Attorney.

Oct. 29, 1957    G. H. DIMOND    2,811,002
CAPPING CHUCK
Filed March 22, 1955    2 Sheets-Sheet 2
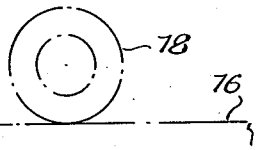
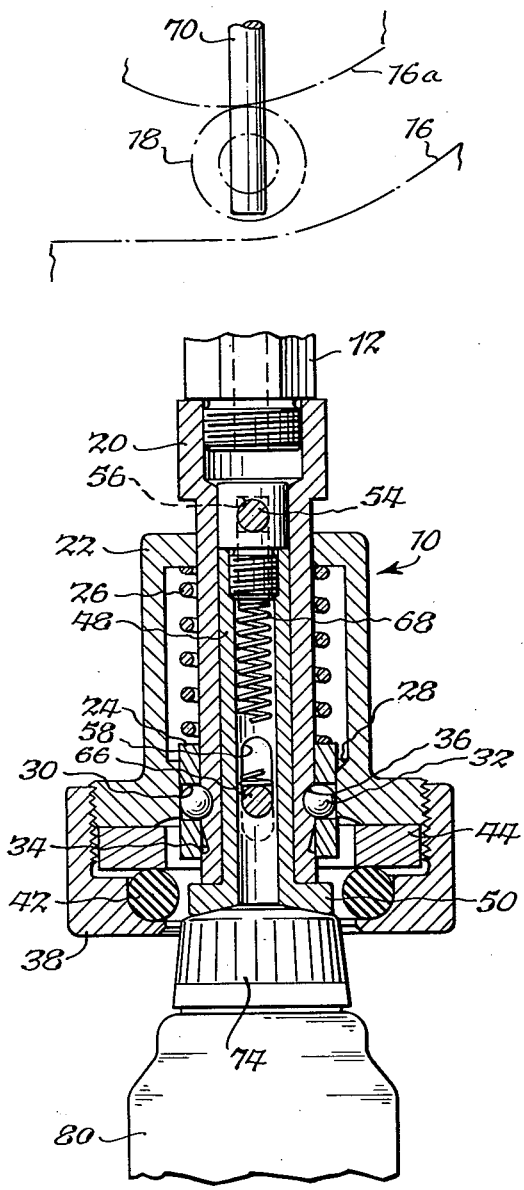
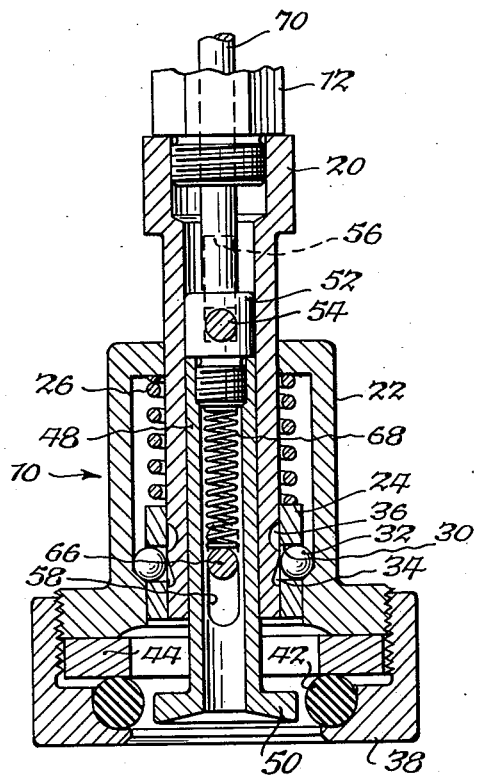
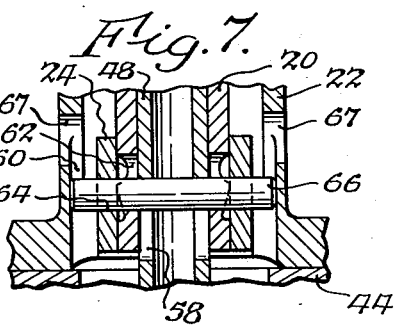
INVENTOR.
George H. Dimond
BY
John J. McGlew
Attorney.

United States Patent Office 2,811,002
Patented Oct. 29, 1957

2,811,002

CAPPING CHUCK

George H. Dimond, East Aurora, N. Y., assignor to Consolidated Packaging Machinery Corporation, Buffalo, N. Y., a corporation of New York Application March 22, 1955, Serial No. 495,844

8 Claims. (Cl. 53—342)

This invention relates in general to capping chucks for machines which are adapted to place caps onto successively presented containers, and particularly refers to a capping chuck which may be used to place caps onto the necks of containers having no shoulders or rims near their tops for the chuck to contact during capping operations.

The capping chuck of the invention has particular application in cases where it is necessary to press-seat a cap onto the neck of a container which has no rim or shoulder surrounding the neck and whereon the cap may be fitted either very tightly, or very loosely, or indifferently.

With some previously known capping chucks the outer mechanical parts of the capping chuck rest on the ledge of the container while internal mechanisms of the chuck are effective to press a cap onto the container neck. If the container to be capped does not have a rim for the outer parts to rest upon these chucks will not operate satisfactorily because there is nothing to offer resistance to the outer mechanical parts and thereby permit relative movement of the internal mechanisms to disengage the cap from the chuck. Consequently, any loose fitting caps are pulled off the containers by these chucks as fast as they are put on.

The present invention overcomes these objections by providing a quick release mechanism effective upon the operation of internal cap-seating means to press-seat and hold a cap on the neck of a container and to rapidly disengage the outer portions of the chuck from the cap.

Accordingly, it is an object of this invention to provide a capping chuck capable of automatically press-seating caps onto the necks of rimless containers.

It is a further object to provide a chuck of the character described, including an outer cap-engaging ring relatively movable with respect to an inner cap-seating stripper sleeve whereby to permit the cap-engaging ring to move rapidly upwardly after a cap has been applied to a container to disengage the cap therefrom after the stripper sleeve has press-seated the cap onto the container neck.

Of the drawings,

Fig. 5 is a vertical section similar to Fig. 2, but showing the capping chuck in position immediately after applying a cap to a container;

Fig. 6 is a view similar to Figs. 2 and 5, but showing the capping chuck in position for discharging the cap whenever a container may not have been present during the cycle of chuck operation; and Fig. 7 is a fragmentary vertical section taken on the line 7—7 of Fig. 4.

Figure 2:
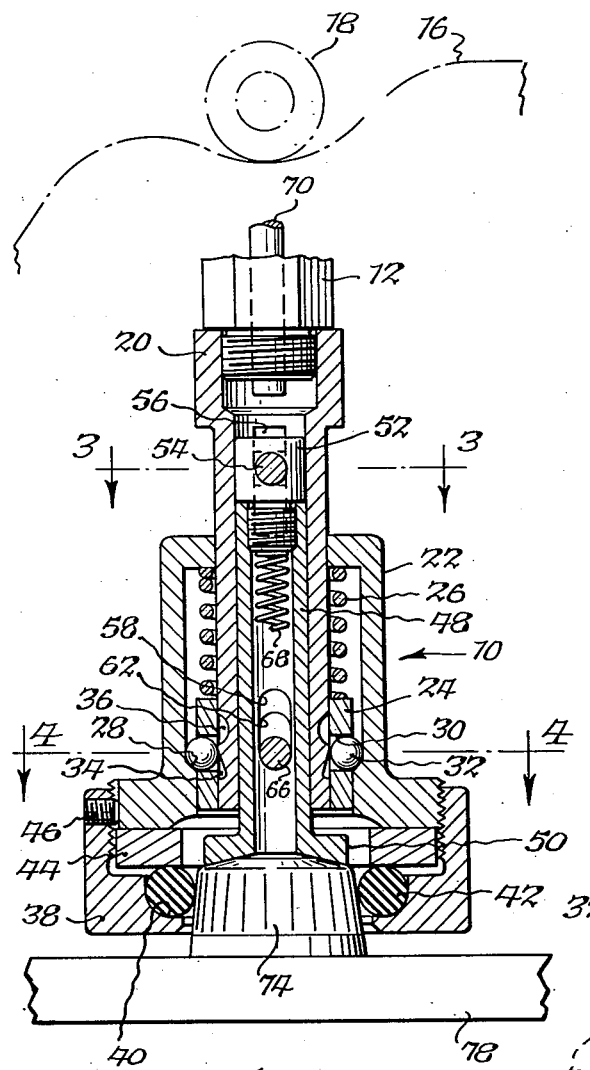
Fig. 2 is an enlarged transverse vertical section of a capping chuck constructed in accordance with this invention, showing the chuck at the start of the capping cycle and the relative position of the capping chuck cam follower.
Figure 1:
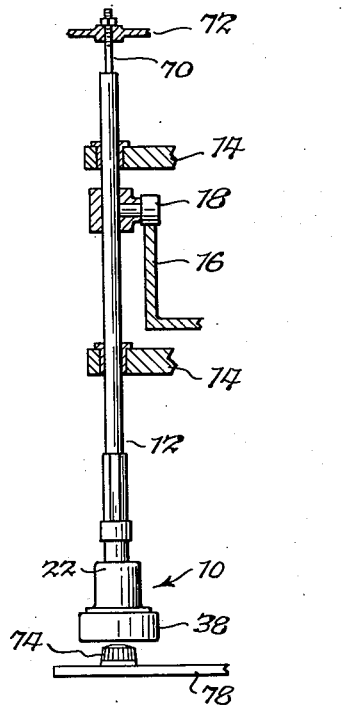
Fig. 1 is a front elevation, partly in section, of a single spindle assembly of a capping machine which shows the operating mechanism for a capping chuck constructed in accordance with this invention.
Figure 3:
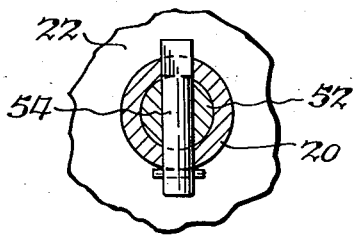
Fig. 3 is a horizontal section taken on the line 3—3 of Fig. 2.
Figure 4:
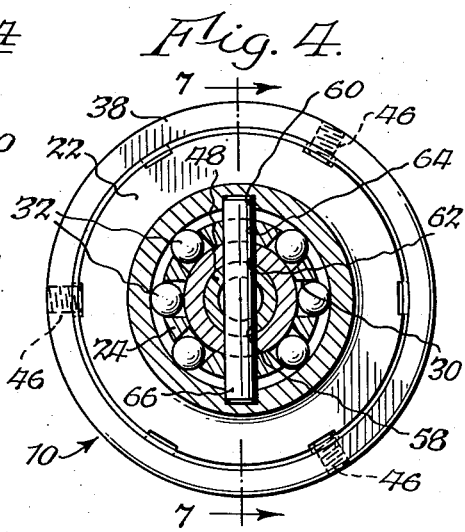
Fig. 4 is a horizontal section taken on the line 4—4 of Fig. 2.

Referring to the drawings in detail, the invention as embodied herein comprises a capping chuck generally designated 10 which is mounted on the lower end of a hollow spindle 12 reciprocably carried in suitable bearings in two spindle plates 14 in the rotary turret of a capping machine (not shown). The capping chuck is reciprocated under the control of a cylinder cam 16 and a spring-loaded presser cam 16a which remain stationary but which are operatively engaged by a roller follower 18 mounted on the spindle 12. The spindle plates 14, 14 are constantly rotated by known mechanisms (not shown), resulting in the reciprocation of the capping chuck 10 by the action of the cam follower 18 which is moved along the upper surface of the cam 16.

The chuck 10 is connected to the lower end of the spindle 12 through the medium of a vertically extending chuck sleeve 20 having an upper portion of larger diameter which is threaded on to the spindle 12. A bell-shaped member 22 having a flanged externally threaded bottom portion is slidably mounted on the sleeve 20. An interlock sleeve 24 is also slidably mounted on the sleeve 20 adjacent the lower portion of the member 22 and has its outer surface disposed in sliding contact with the inner flange of the member 22. The inner diameter of the bell-shaped member 22 in the central and upper portions thereof is greater than the outside diameter of the interlock sleeve 24 and thus a camlike ledge 28 is formed on top of the inner flange of the bottom portion of the bell-shaped member 22. A compression spring 26 is positioned between the top of the interlock sleeve 24 and the upper inside surface of the bell-shaped member 22.

The interlock sleeve 24 is provided with a plurality of radially extending apertures 30 around its periphery to hold a similar number of steel balls 32 of such a diameter that portions thereof will extend outwardly therefrom in contact with the camlike ledge 28 when the capping chuck 10 is in a cocked position in the initial stage of its operation. The chuck sleeve 20 adjacent the balls 32 is undercut slightly as at 34 to provide an annular ramp to bias the balls toward this position. The bell-shaped member 22 is biased upwardly by the spring 26. However, the steel balls contacting the camlike ledge 28 prevent its upward movement when the chuck is in a cocked position.

The chuck sleeve 20 is provided with either a plurality of semi-spherical recesses or an annular groove 36 of approximately semi-circular cross-section which is spaced slightly upwardly from the ramp 34. These recesses or the groove 36, as the case may be, permit the steel balls 32 to roll off the camlike ledge 28 and lodge therein during the operative downward movement of the chuck sleeve 20 relative to the interlock sleeve 24, thus permitting the bell-shaped member 22 to move upwardly rapidly under the influence of the spring 26.

The lower flanged portion of the bell-shaped member 22 is externally threaded to receive an internally threaded nose ring 38. The nose ring 38 has a thin-walled upper portion having internal threads thereon and a thick-walled lower portion having an annular ledge 40 of arcuate cross-section around its inner edge which carries a cap-engaging gripper ring 42 of a resilient material such as rubber. The ring 42 is held in place in the recess 40 by a washer 44 which is inserted into the thin-walled portion of the nose ring 38 between the bell-shaped member 22 and the ring 42.

The nose ring 38 may be turned up very tightly on the bell-shaped member 22 to compress the resilient ring 42 between the washer 44 and the recess 40. This compression will result in the bulging of the inner wall of the ring 42 to adjust the inner diameter thereof and may be resorted to after the ring 42 begins to wear or whenever slightly smaller diameter caps are to be handled. It is also possible to adjust the vertical position of the ring 42 by changing the thickness of the washer 44 and thereby the position of the nose ring 38 on the bell-shaped member 22. Once the nose ring is threaded onto the bell-shaped member to the desired position and tightness it is locked against further rotation by a set screw 46 which extends through the thin-walled portion of the nose ring into contact with the bell-shaped member 22.

A stripper sleeve 48 is slidably carried inside the chuck sleeve 20 and is provided with a plunger 50 at the bottom thereof which extends below the chuck sleeve 20. The upper portion of the stripper sleeve 48 is provided with a top plug 52 which is threaded into the top of the sleeve. A pin 54 extends through the plug 52 and through vertically extending rectangular slots 56 in the walls of the chuck sleeve 20. When the chuck sleeve 20 is moved downwardly relative to the stripper sleeve 48 the bottom contacts plunger 50 and effects downward movement of the stripper sleeve (see Fig. 5). The pin 54 extends beyond the sleeve 20 and is effective to contact the top of the bell-shaped member to move it downwardly during re-cocking of the chuck in a manner to be described more fully hereinafter.

The intermediate portion of the stripper sleeve 48 is provided with a pair of diametrically opposed, vertically extending slots 58. Corresponding vertically extending grooves 60 are provided in the inner walls of the bell-shaped member 22, and a shorter set of slots 62 equal in width to the grooves 60 is provided in the chuck sleeve 20. The interlock sleeve 24 is provided with a set of diametrically opposed holes 64. A pin 66 extends through the slots 58 and 62 and the holes 64 with its ends engaged in the grooves 60. A compression spring 68 is interposed between the bottom of the cap 52 and the pin 66 to bias the stripper 48 upwardly so that its weight will not tend to eject the cap prematurely. The bell-shaped member 22 is provided with two diametrically opposite holes 67 in alignment with the pin 66 to facilitate machining of the grooves 60.

A depending stripper rod 70 is affixed to a bracket 72 mounted on the upper spindle plate 14 and depends downwardly inside the hollow spindle 12. The spindle 12 is reciprocated by the cam 16 through the cam follower 18 to raise the chuck 10 so that the stripper rod 70 becomes effective relatively to push downwardly against the plug 52 on the top of the stripper sleeve 48 for chuck cocking purposes whenever the cam follower 18 approaches a high portion on the cam 16 (see Fig. 6).

In the operation of the machine, mechanisms (not shown) are provided to feed a cap 74 onto a stud (not shown) of a moving cap disc 78. Means (not shown) are then provided to rotate the turret carrying the spindle plates 14 to cause the cam follower 18 to move over the surface of the cylinder cam 16. Thereupon the capping chuck 10 is moved into overhead alignment with the cap 74 and the cam 16 becomes effective to cause the follower 18 and its associated spindle 12 carrying the capping chuck 10 first to move downwardly (see Fig. 2) until the cap 74 is gripped by the resilient ring 42 which is moved down thereover and then upwardly to remove the cap from the stud.

Mechanisms (not shown) in the machine become effective to move a container 80 into alignment with the capping chuck 10, and the latter is caused to move downwardly over the container to apply the cap thereto.

As the chuck sleeve 20 continues to move downwardly under the control of the cam 16 and the spring-loaded presser cam 16a after the cap is positioned on the neck of the container 80 the stripper sleeve plunger 50 resists further downward movement as the cap is seated on the container neck. Thereupon the chuck sleeve 20 moves downwardly relative to the other chuck parts until the bottom of the chuck sleeve contacts the plunger 50 and the groove 36 comes into alignment with the balls 32. At this point (see Fig. 5) the balls are moved into the groove 36 as the result of the camming action of the ledge 28 and the action of the spring 26, thereby freeing the bell-shaped member 22 which is rapidly moved upwardly by the spring 26 to a position where its top contacts the projecting ends of the pin 54 and thereupon the gripper ring 42 becomes disengaged from the cap. The stripper sleeve 48 continues its movement through the action of the bottom of the chuck sleeve 20 on the plunger 50 to complete seating of the cap on the container.

Upon the completion of the capping of the container the spindle 12 and the chuck 10 thereupon move upwardly under the action of the cam 16 until the stripper rod 70 extends downwardly into the chuck sleeve 20 so that its lower end contacts the plug 52 and moves the stripper sleeve 48 relatively downwardly. Simultaneously the projecting ends of the pin 54 which are in contact with the top of the bell-shaped member 22 move it relatively downwardly. Thereafter the upper ends of the slots 58 of the stripper sleeve 48 contact the pin 66 to move it relatively downwardly together with the interlock sleeve 24. The relative downward movement of the interlock sleeve 24 causes the balls 32 to move out of the groove 36 and back into a cocked position against the ramp 34 of the chuck sleeve 20 and into engagement with the camlike ledge 28 to lock the chuck into its re-cocked position.

The relative downward movement of the stripper sleeve 48 under the influence of the stripper rod 70 toward the end of the capping cycle serves the added function of ejecting a cap in the event that no container was contacted for a capping operation.

This invention provides a simple chuck for seating tight, loose or intermediately fitting caps onto containers which have no rims. The chuck can be operated at very high speeds.

It is, of course, to be understood that various details of arrangements and proportions of parts may be modified within the scope of the appended claims.

I claim:

1. A container capping chuck for press-seating caps onto the necks of rimless containers comprising: a vertically elongated chuck sleeve, an upwardly biased bell-shaped member slidably mounted on said chuck sleeve, restraining means positioned inside said bell-shaped member between said chuck sleeve and said bell-shaped member and normally holding said bell-shaped member against upward movement relative to said chuck sleeve, a stripper sleeve slidably mounted within said chuck sleeve and having a cap-seating plunger at the bottom thereof extending below said chuck sleeve, cap-engaging means affixed to the bottom of said bell-shaped member, and means effective upon the downward movement of said chuck sleeve relative to said bell-shaped member to release said restraining means whereby to permit said bell-shaped member and said cap-engaging means to move rapidly upwardly relative to said chuck sleeve for cap-disengaging purposes.

2. A container capping chuck for press-seating caps onto the necks of rimless containers comprising: a vertically elongated chuck sleeve, an upwardly biased bell-shaped member slidably mounted on said chuck sleeve, restraining means positioned inside said bell-shaped member between said chuck sleeve and said bell-shaped member and normally holding said bell-shaped member against upward movement relative to said chuck sleeve, a stripper sleeve slidably mounted within said chuck sleeve and having a cap-seating plunger at the bottom thereof extending below said chuck sleeve, cap engaging means affixed to the bottom of said bell-shaped member, means effective after initial downward movement of said chuck sleeve to move said stripper sleeve downwardly, and means effective upon the downward movement of said chuck sleeve relative to said bell-shaped member to release said restraining means whereby to permit said bell-shaped member and said cap-engaging means to move rapidly upwardly relative to said chuck sleeve for cap-disengaging purposes.

3. A container capping chuck for press-seating caps onto the necks of rimless containers comprising: a vertically elongated chuck sleeve provided with a plurality of recesses around its outer periphery near the lower end thereof, a bell-shaped member slidably mounted on said chuck sleeve and provided with an internal ledge near the bottom thereof, an interlock sleeve slidably mounted on said chuck sleeve adjacent the lower portion of said bell-shaped member and provided with a plurality of apertures aligned with and equal in number to the recesses in said chuck sleeve, a compression spring positioned between the inner top of said bell-shaped member and the upper edge of said interlock sleeve, a stripper sleeve slidably mounted within said chuck sleeve and having a cap-seating plunger at the bottom thereof extending below said chuck sleeve, cap-engaging means affixed to the bottom of said bell-shaped member, and a plurality of balls equal in number to the recesses in said chuck sleeve and normally held in the apertures of said interlock sleeve in such positions as to extend outwardly onto the ledge of said bell-shaped member whereby to prevent relative upward movement of the latter; said balls, upon downward movement of said chuck sleeve to a position with the recesses thereon in registry with said balls, being rollable into said recesses whereby to clear said ledge and permit upward movement of said bell-shaped member under the influence of said spring.

4. A container capping chuck for press-seating caps onto the necks of rimless containers comprising: a vertically elongated chuck sleeve provided with a plurality of recesses around its outer periphery near the lower end thereof, a bell-shaped member slidably mounted on said chuck sleeve and provided with an internal ledge near the bottom thereof, an interlock sleeve slidably mounted on said chuck sleeve adjacent the lower portion of said bell-shaped member and provided with a plurality of apertures aligned with and equal in number to the recesses in said chuck sleeve, a compression spring positioned between the inner top of said bell-shaped member and the upper edge of said interlock sleeve, a stripper sleeve slidably mounted within said chuck sleeve and having a cap-seating plunger at the bottom thereof extending below said chuck sleeve, a nose ring affixed to the bottom of said bell-shaped member, a cap-engaging ring of resilient material lining the inside of said nose ring, means effective after initial downward movement of said chuck sleeve to move said stripper sleeve downwardly, and a plurality of balls equal in number to the recesses in said chuck sleeve and normally held in the apertures of said interlock sleeve in such positions as to extend outwardly onto the ledge of said bell-shaped member whereby to prevent relative upward movement of the latter; said balls, upon downward movement of said chuck sleeve to a position with the recesses thereon in registry with said balls, being rollable into said recesses whereby to clear said ledge and permit upward movement of said bell-shaped member under the influence of said spring.

5. A container capping chuck for press-seating caps onto the necks of rimless containers comprising: a vertically elongated chuck sleeve provided with a pair of diametrically opposite vertically extending slots near the top thereof, an upwardly biased bell-shaped member slidably mounted on said chuck sleeve, restraining means positioned inside said bell-shaped member between the latter and said chuck sleeve and normally holding said bell-shaped member against upward movement relative to said chuck sleeve, a stripper sleeve slidably mounted within said chuck sleeve and having a cap-seating plunger at the bottom thereof, a horizontally disposed pin connected to the top of said stripper sleeve and extending through the slots in said chuck sleeve and effective to move said stripper sleeve downwardly after said chuck sleeve has moved downwardly a distance sufficient to bring the top edges of the slots to contact said pin, cap-engaging means affixed to the bottom of said bell-shaped member, and means effective upon the downment movement of said chuck sleeve relative to said bell-shaped member to release said restraining means whereby to permit said bell-shaped member to move rapidly upwardly relative to said chuck sleeve for cap-disengaging purposes.

6. A container capping chuck for press-seating caps onto the necks of rimless containers comprising: a vertically elongated chuck sleeve provided with a pair of diametrically opposite vertically extending slots near the top thereof and a plurality of hemi-spherical recesses around the outer periphery near the lower end thereof, a bell-shaped member slidably mounted on said chuck sleeve and provided with an internal ledge near the bottom thereof, an interlock sleeve slidably mounted on said chuck sleeve adjacent the lower portion of said bell-shaped member and provided with a plurality of apertures aligned with and equal in number to the recesses on said chuck sleeve and provided with a pair of diametrically opposite holes in the central portion thereof, a stripper sleeve slidably mounted within said chuck sleeve and provided with a cap seating plunger at the bottom thereof, and two opposite vertically extending slots intermediate the height thereof, a plug affixed to the top of said stripper sleeve and provided with a horizontally extending hole therethrough, a pin extending through the hole in said top plug and through the slots in said chuck sleeve and being effective to move said stripper sleeve downwardly after said chuck sleeve has moved downwardly a distance sufficient to bring the top edges of the slots to contact said pin, a second horizontally disposed pin extending through the slots in said stripper sleeve, the slots in said chuck sleeve and the holes in said interlock sleeve, a compression spring positioned between the top of said bell-shaped member and the upper edge of said interlock sleeve, a second compression spring positioned between the plug of said stripper sleeve and said second pin, a nose ring affixed to the bottom of said bell-shaped member, a cap-engaging ring of resilient material secured within said nose ring, and a plurality of balls equal in number to the recesses on said chuck sleeve and normally held in the apertures of said interlock sleeve in such positions as to extend outwardly onto the ledge of said bell-shaped member whereby to prevent relative upward movement of the latter; said balls being rollable into said recesses upon downward movement of said chuck sleeve to a position at which the recesses thereon register therewith whereby to clear said ledge and permit upward movement of said bell-shaped member under the influence of said first-mentioned spring.

7. In a container capping machine wherein is provided a vertically reciprocable hollow capping spindle, means for reciprocably supporting said capping spindle and means for cyclically reciprocating said capping spindle, the combination of: a capping chuck secured to the lower end of the capping spindle and including a vertically elongated chuck sleeve, an upwardly biased bell-shaped member slidably mounted on said chuck sleeve, restraining means positioned inside said bell-shaped member between said chuck sleeve and said bell-shaped member and normally holding the latter against upward movement relative to said chuck sleeve, a stripper sleeve slidably mounted within said chuck sleeve and having a flanged bottom extending below said chuck sleeve, cap-engaging means affixed to the bottom of said bell-shaped member, means effective upon the downward movement of said chuck sleeve relative to said bell-shaped member to release said restraining means whereby to permit said bell-shaped member and said cap-engaging means to move rapidly upwardly relative to said chuck sleeve, and means effective upon the upward movement of said spindle and said chuck to move said stripper sleeve downwardly, whereby to eject a cap from said cap-engaging means in the event one is present therein and to return said bell-shaped member to its restrained position.

8. In a container capping machine wherein is provided a vertically reciprocable hollow capping spindle, means for reciprocably supporting said capping spindle and means for cyclically reciprocating said capping spindle, the combination of: a capping chuck secured to the lower end of the capping spindle and including a vertically elongated chuck sleeve, an upwardly biased bell-shaped member slidably mounted on said chuck sleeve, restraining means positioned inside said bell-shaped member between said chuck sleeve and said bell-shaped member and normally holding the latter against upward movement relative to said chuck sleeve, a stripper sleeve slidably mounted within said chuck sleeve and having a flanged bottom extending below said chuck sleeve, cap-engaging means affixed to the bottom of said bell-shaped member, means effective upon the downward movement of said chuck sleeve relative to said bell-shaped member to release said restraining means whereby to permit said bell-shaped member and said cap-engaging means to move rapidly upwardly relative to said chuck sleeve, a stationary stripper rod extending downwardly through said capping spindle a distance sufficient to protrude below said capping spindle into said chuck sleeve during the upper portion of reciprocation of said spindle to contact said stripper sleeve to prevent further upward motion thereof while permitting continued upward motion of said chuck sleeve and said bell-shaped member whereby to eject any unapplied cap that may be carried by said cap-engaging means and to effect the return of said bell-shaped member to its restrained position.

References Cited in the file of this patent

UNITED STATES PATENTS

| | | |
|---|---|---|
| 2,190,509 | Baum | Feb. 13, 1940 |
| 2,422,750 | Rue | June 24, 1947 |